US006154453A

United States Patent [19]

Kim et al.

[11] Patent Number: 6,154,453

[45] Date of Patent: Nov. 28, 2000

[54] METHOD OF SELECTING VOCODER IN CODE DIVISION MULTIPLE ACCESS MOBILE COMMUNICATION SYSTEM

[75] Inventors: Jong-Woo Kim, Seoul; Dong-Myoung Kim, Kyoungki-do, both of Rep. of Korea

[73] Assignee: Hyundai Electronics Ind. Co., Ltd., Kyoungki-do, Rep. of Korea

[21] Appl. No.: 08/977,448

[22] Filed: Nov. 24, 1997

[30] Foreign Application Priority Data

Dec. 2, 1996 [KR] Rep. of Korea ...................... 96-60988

[51] Int. Cl.[7] .................................................... H04B 7/216

[52] U.S. Cl. ............................................ 370/335; 370/441

[58] Field of Search .................................... 370/503, 509, 370/510, 512, 252, 338, 328, 329, 336, 310, 335, 441; 704/200, 500, 221; 455/453, 445, 560

[56] References Cited

U.S. PATENT DOCUMENTS 5,361,396 11/1994 Onoe et al. .
5,442,807 8/1995 Takayama .
5,959,981 9/1999 Bruckert et al. ........................ 370/331
6,058,136 5/2000 Ganesh et al. .......................... 375/200

*Primary Examiner*—Chi H. Pham
*Assistant Examiner*—Brenda H. Pham
*Attorney, Agent, or Firm*—Reed Smith Shaw & McClay LLP

[57] ABSTRACT

A method of selecting a vocoder in a CDMA mobile communication system, includes the steps of: indexing shelves, slots, and vocoders, before sequentially selecting a shelf and a slot according to the order of index, and, after detecting a frame offset of a present call, calculating a number of frame offsets identical with the frame offset of the present call contained in the selected slot; and comparing the number of the frame offsets, which are identical with the present call's frame offset and contained in the slot sequentially selected, with numbers of the identical frame offsets contained in other slots, and selecting a slot having the fewest frame offsets identical with the present call's frame offset.

8 Claims, 6 Drawing Sheets

METHOD OF SELECTING VOCODER IN CODE DIVISION MULTIPLE ACCESS MOBILE COMMUNICATION SYSTEM

BACKGROUND OF THE INVENTION

1. Field of the Invention

The present invention relates to a method of selecting a vocoder in a code division multiple access (CDMA) mobile communication system. Specifically, this invention is a vocoder selection method where, after a shelf, a slot, and a vocoder are sequentially selected when a call occurs, the selected slot and other slots are compared in their numbers of frame offsets identical with the frame offset of the call to detect a slot containing the minimum number of the frame offsets, therefore preventing the same frame offsets from being drawn together in a specific slot in a CDMA mobile communication system.

2. Discussion of Related Art

When selecting a vocoder located at a specific slot for allocation of a call in a CDMA mobile communication system, the value of the frame offset of the call which was allocated to the slot lastly is detected and compared with the frame offset of a call which will be allocated. If the two frame offsets are identical, a vocoder located at the next slot is selected. Essentially, even though the selected slot contains many frame offsets identical with the frame offset of a present call to be allocated, if the frame offset of the call which will be allocated is different from the frame offset of the last call, the vocoder in the selected slot is selected for the present call. There is a problem that same frame offsets tend to be drawn in one specific frame offset.

For example, it is assumed that frame offsets of calls in a slot, which is selected and is in process, are as follows: 0→2→0→3→0→4→0→1, where there are four "0" frame offsets, and "1" is allocated to the last call. Even though another slot has "0" frame offset less than four, if the frame offset of the call which will be allocated is "0" which is different from the last call frame offset "1", the vocoder located at the presently selected slot is selected for the call.

When the same frame offsets come together in a specific slot as described above, delay can occur while processing data within 20 ms in the CDMA mobile communication system, thereby deteriorating the quality of sound in communication and bringing about overload in a base station caused by the overload in a specific slot.

SUMMARY OF THE INVENTION

Accordingly, the present invention is directed to a method of selecting a vocoder in a CDMA mobile communication system. that substantially obviates one or more of the limitations and disadvantages of the related art.

An object of the present invention is to provide a vocoder selection method for allocating a call to a slot containing the minimum number of frame offsets which is the same as the frame offset of the call to be allocated after computing information of all frame offsets of calls in process, thereby preventing the concentration of the same frame offsets to a specific slot in a mobile communication system.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a method of selecting a vocoder in a CDMA mobile communication system, the method including the steps of: indexing shelves, slots, and vocoders, before sequentially selecting a shelf and a slot according to the order of index, and, after detecting a frame offset of a present call, calculating a number of frame offsets identical with the frame offset of the present call contained in the selected slot; and comparing the number of the frame offsets, which are identical with the present call's frame offset and contained in the slot sequentially selected, with numbers of the identical frame offsets contained in other slots, and selecting a slot having the fewest frame offsets identical with the present call's frame offset.

If the slots of the shelf have the same numbers of the frame offsets, which are identical with the present call's frame offset, a vocoder contained in the slot of the shelf which was originally selected is selected.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

With reference to the attached drawings, the present invention is described below in detail.

Figure 1:
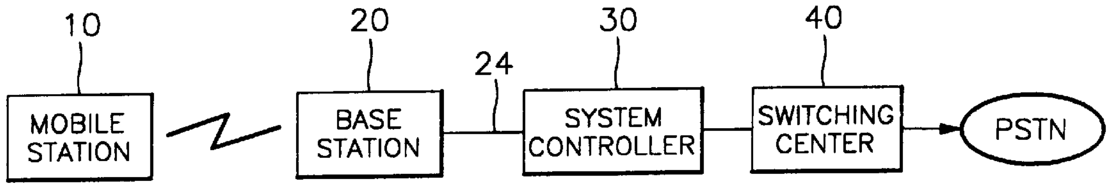
FIG. 1 is a schematic block diagram of a usual CDMA mobile communication system.

As shown in FIG. 1, mobile station 10 which receives a pilot channel signal selects and communicates with the most adjacent base station. Base station 20 modulates/demodulates voice signals received from the mobile station 10, before transmitting them to system controller 30 through E1 link 24. System controller 30 converts the voice signals received from base station 20 into PCM codes before sending them to switching center 40. Switching center 40 interfaces a public switched telephone network (PSTN) and base station 20.

Figure 2:
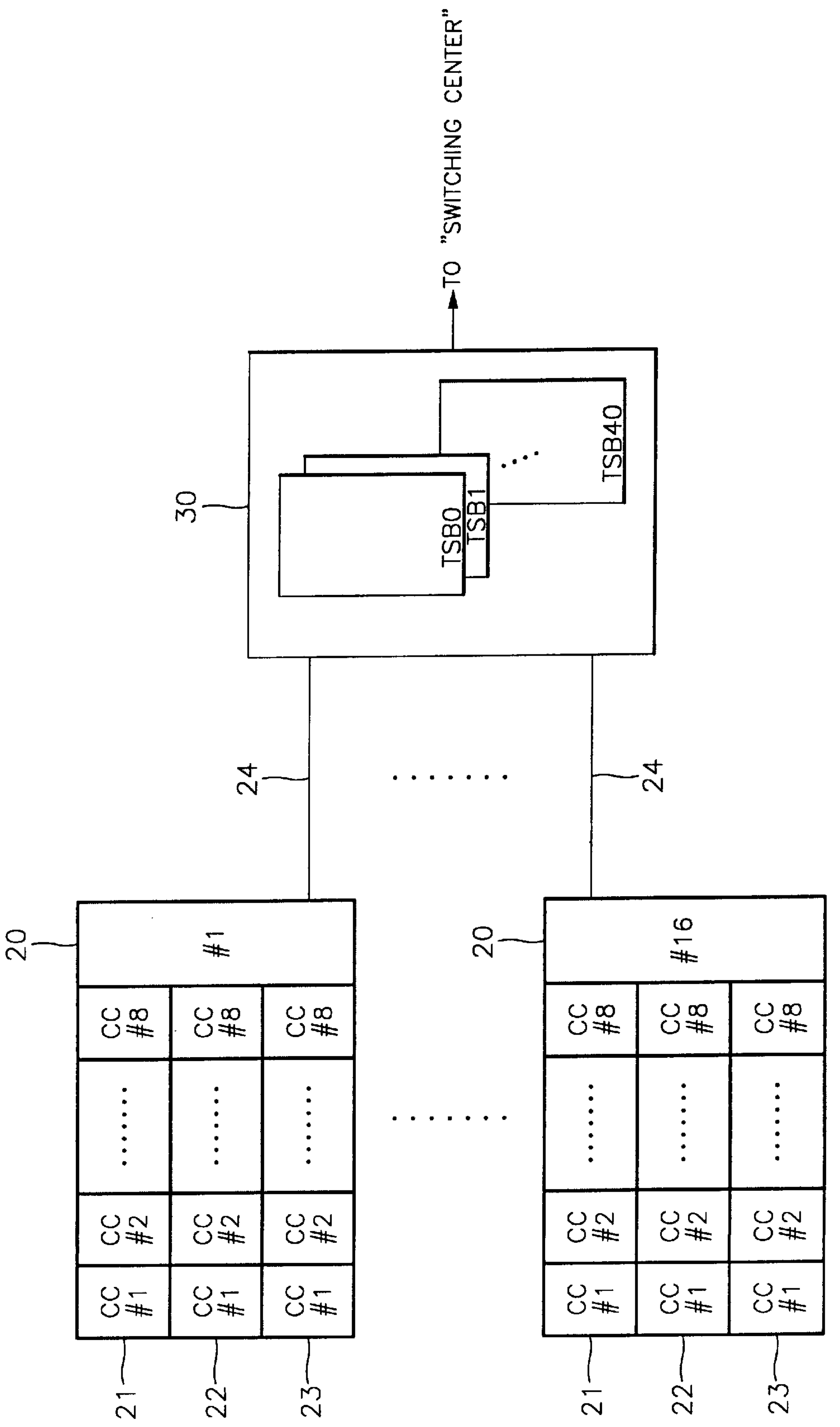
FIG. 2 is a block diagram including a base station and a system controller.

As shown in FIG. 2, sixteen base stations 20 maximum can be connected to one system controller 30. Base station 20 contains multiple shelves (three shelves in this embodiment). Shelves 21, 22, 23, which respectively contain eight channel cards (CC#1, . . . CC#8), convert a signal received from mobile station 10 into a digital signal before sending it to a vocoder (DSP) in system controller 30. Forty transcoder selector banks (TSB) maximum can be installed in system controller 30.

Figure 3:
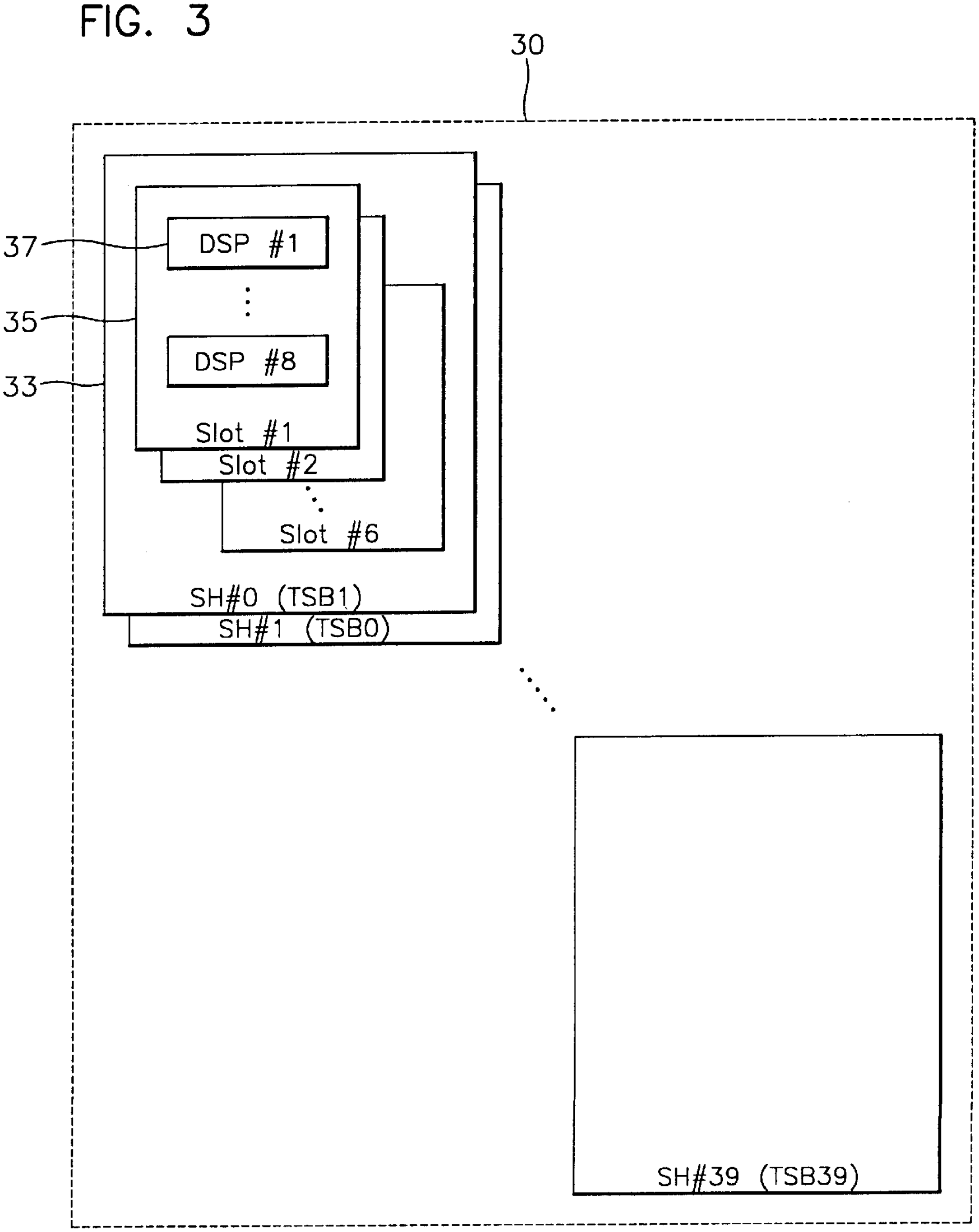
FIG. 3 is a block diagram of a system controller.

FIG. 3 is a block diagram of a system controller. Forty TSBs are respectively installed in forty shelves 33. The shelves 33 are provided with indexes (SH#0, . . . , SH#39). Six vocoder cards are respectively installed in six selector vocoder processor (SVP) slots 35 in a shelf 33. Eight vocoders 37, which are installed in a vocoder card, are provided with indexes (DSP#1, . . . , DSP#8).

When a call transmitted from base station 20 is allocated, first, a shelf is selected among multiple shelves (forty shelves in this embodiment) according to the sequence of their indexes. For example, first shelf SH#0 is selected, then second shelf SH#1 is selected. In such way, shelves are sequentially selected up to fortieth shelf SH#39. After selecting shelves from first one to last fortieth one, such the selection process is continuously repeated from the first shelf SH#0 to fortieth one SH#39.

Once a shelf 33 is selected in such the manner, a vocoder card is selected. Selecting the vocoder card is equal to selecting a slot 35 (SLOT#1, . . . , SLOT#6) where the vocoder card is inserted. In the same manner of selecting shelf 33, a slot is sequentially selected from first slot, SLOT#1, to sixth slot, SLOT#6, and the process is repeated.

After a slot 35 is selected, a vocoder 37 is selected. The vocoder is also sequentially selected according to the order of its index. The sequential selection is performed starting from a low number or a high number.

After selecting the shelf, slot, and vocoder according to index, a frame offset of a present call is detected. The number of the frame offsets, identical with the present call frame offset, which are contained by the selected slot, is then calculated. The numbers of the frame offsets, identical with the frame offset of the present call, which are contained by other slots, are calculated. The number of the frame offsets contained by the selected slot is compared with the numbers of the frame offsets contained by other slots, then a slot containing the fewest frame offsets, which are identical with the present call frame offset, is selected.

Figure 4:
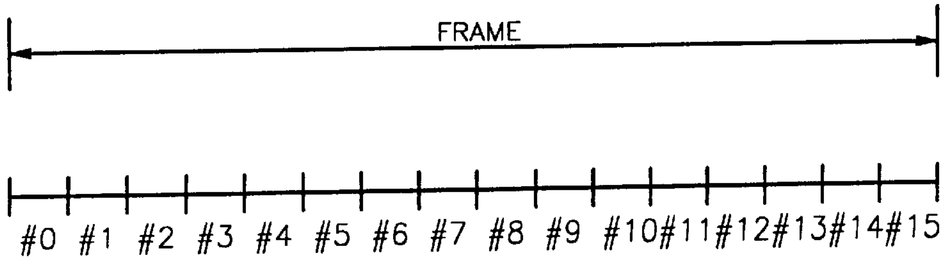
FIG. 4 shows a structure of a frame.
Figure 5:
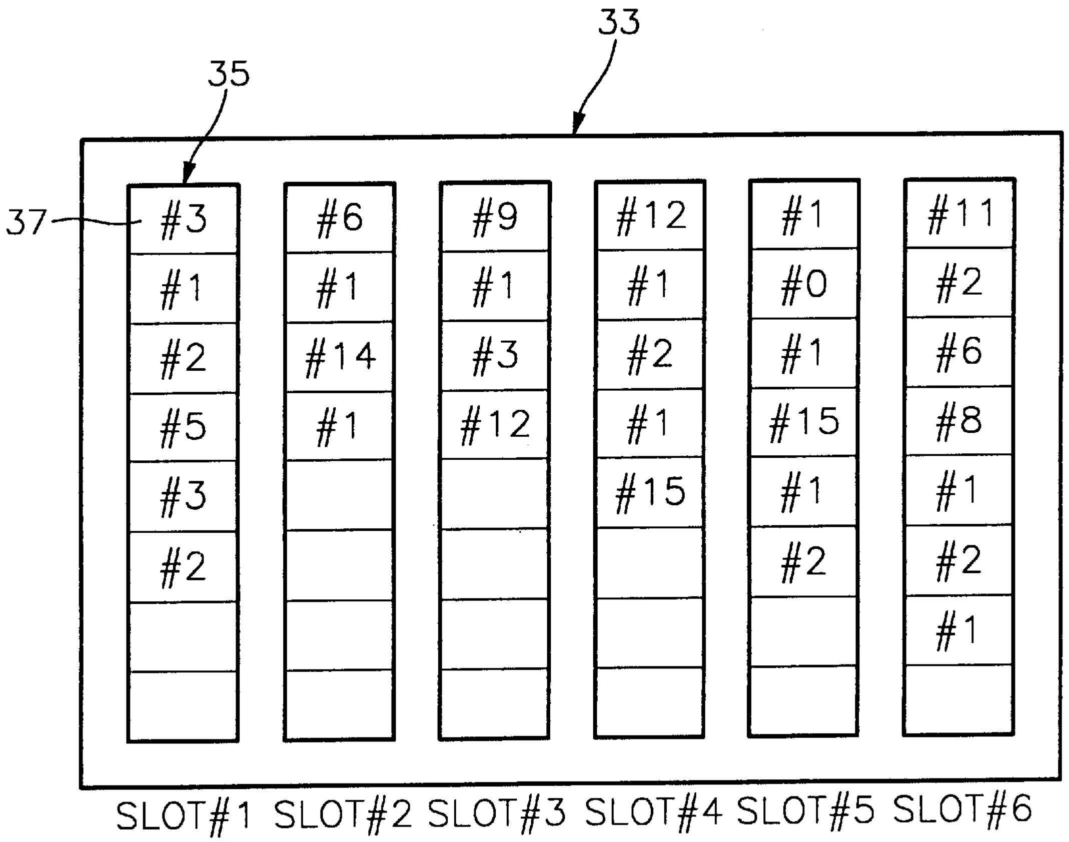
FIG. 5 shows frame offsets of calls allocated to a slot.

As shown in FIG. 4, there are sixteen frame offsets (#1–#15) in a frame. FIG. 5 shows frame offsets of calls allocated to slots. If the frame offset allocated to the present call is #1, SLOT#1 and SLOT#3 contain the fewest #1 frame offsets. According to the order of index starting from a low number, SLOT#1 is selected.

Figure 6:
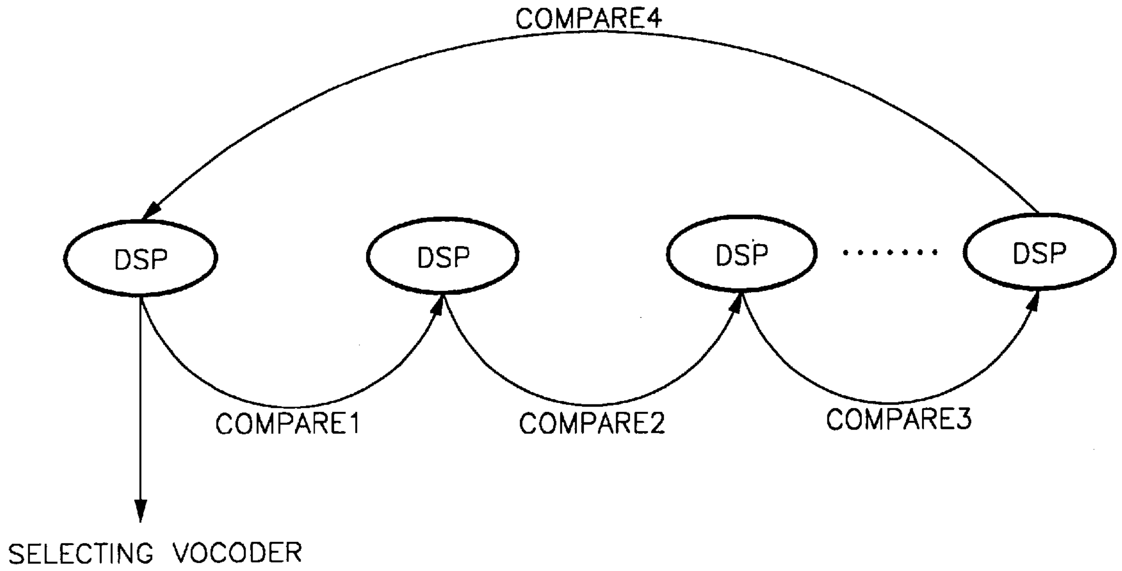
FIG. 6 shows a preferred embodiment of a vocoder selection method according to the present invention.

If it is determined that the slots contain the same numbers of the frame offsets identical with the present call frame offset as the result of comparing the numbers of the identical frame offsets in each slot, the vocoder in the slot which was selected originally is selected for the call allocation. This process is shown in FIG. 6. After selecting a vocoder (first DSP from left side in FIG. 6) at a specific slot in a specific shelf according to the order of index, the number of the frame offsets, which are identical with the present call frame offset and contained in the selected slot, is compared with numbers of the identical frame offsets contained in other slots in other shelves in order to find a slot having the fewest frame offsets identical with the present call's frame offset.

Figure 7:
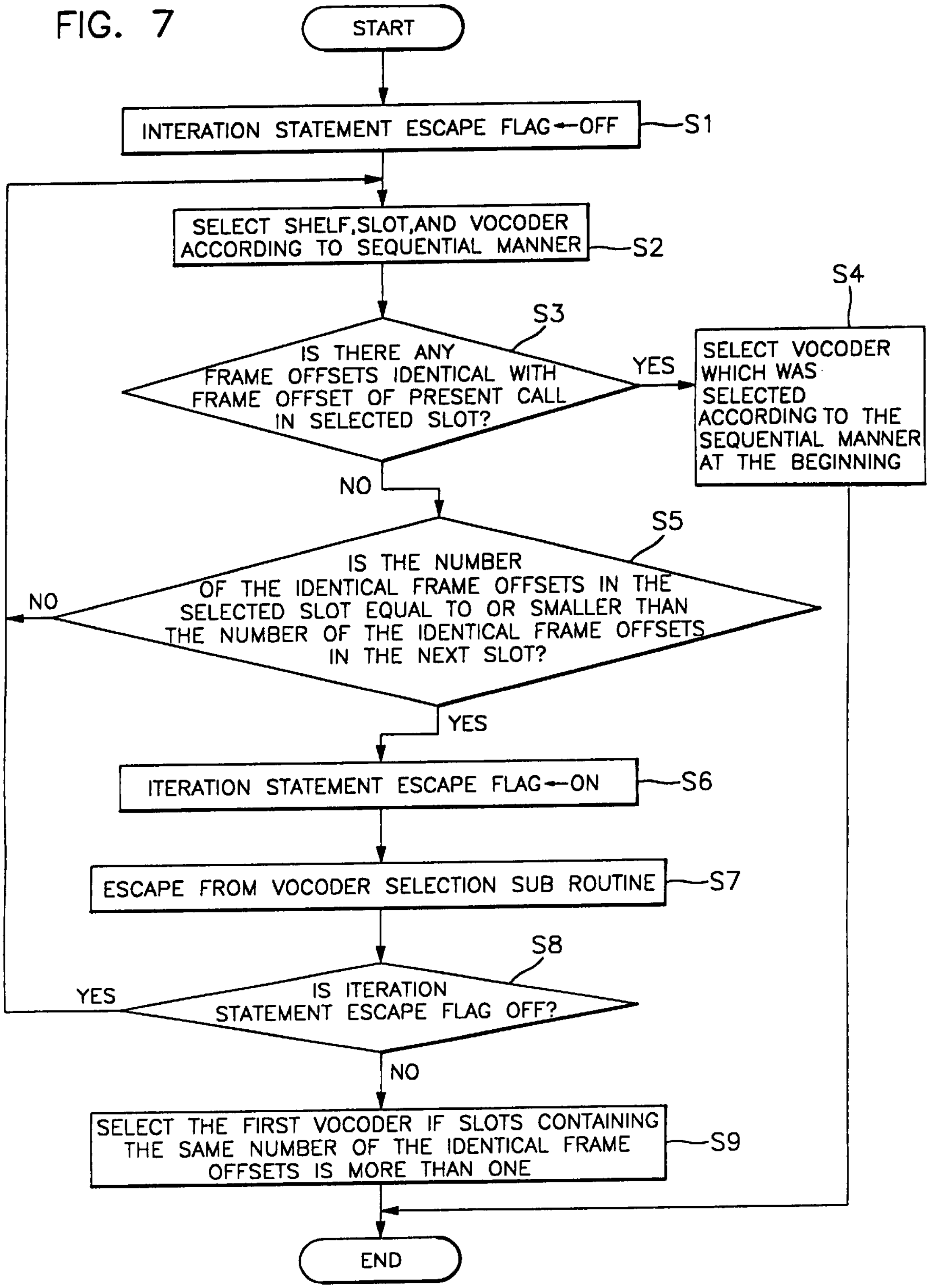
FIG. 7 is a flow chart showing the vocoder selection method according to the present invention.

FIG. 7 is a flow chart according to the present invention. An iteration statement escaping flag is established to "off" (step S1). Shelf 33, slot 35, and vocoder 37 are sequentially selected according to the order of index. They are sequentially selected according to the order of index starting from a low number or a high number (step S2). It is determined if the selected slot contains any frame offsets identical with a frame offset allocated to a present call (step S3). If the slot has no frame offsets identical with the present call's frame offset in the slot, the slot is deemed to contain the fewest frame offsets identical with the present call's frame offset, thus progressing to step S4. The present call is allocated to the vocoder which was sequentially selected according to its index at step S4, then the program ends.

If there are any frame offsets identical with the present call's frame offset in the slot selected, whether or not the number of the frame offsets identical with the present frame offset contained by the slot exceeds the number of the identical frame offsets contained by the next slots is determined (step S5). If the identical frame offsets contained by the slot originally selected is more than those in the next slot, the progress from S2 to S3 is repeated, thus the next slot is selected. If the number of the identical frame offsets in the slot originally selected is equal to or smaller than the number of the identical frame offsets in the next slot, the slot originally selected is deemed to contain the fewest frame offsets identical with the present call's frame offset, thus turning on the flag of escaping the iteration statement and displaying that a vocoder is selected according to the method of the present invention (step S6). The progress escapes from a sub-routine for selecting a vocoder (step S7).

Whether or not the iteration statement escape flag is off is determined (step S8). If the flag is off, the sub-routine is deemed not to performed, thus the steps S2 to S7 are repeated. If the flag is on, the vocoder which was sequentially selected according to its index at the beginning is selected for the call (step S9), then the progress ends.

As described above, the present invention selects a vocoder in such a manner that, after a shelf, a slot, and a vocoder are sequentially selected when a call occurs, the numbers of the frame offsets which are identical with the present call's frame offset and respectively contained by the slot selected and other slots, are compared in order to select a slot containing the fewest frame offsets identical with the present frame offset, therefore preventing the identical frame offsets from being drew together in a specific slot, preventing overload in the system, and improving the sound quality in a CDMA mobile communication system.

It will be apparent to those skilled in the art that various modifications and variations can be made in a vocoder selection method of the present invention without deviating from the spirit or scope of the invention. Thus, it is intended that the present invention cover the modifications and variations of this invention provided they come within the scope of the appended claims and their equivalents.

What is claimed is:

1. A method of selecting a vocoder in a code division multiple access (CDMA) mobile communication system, the method comprising detecting a frame offset of a call when the call occurs and selecting a vocoder contained in a Selector Vocoder Processor (SVP) slot which has fewest frame offsets identical with the detected frame offset.

2. A method according to claim 1, wherein, if two or more (SVP) slots have, the same number of the frame offsets identical with the detected frame offset of the call, a vocoder contained in a (SVP) slot, which precedes other (SVP) slots according to the order of index, is selected.

3. A method of selecting a vocoder in a CDMA mobile communication system having transcoder selector bank (TSB) shelves, each shelf containing selector vocoder processor (SVP) slots, each slot having vocoders, the method comprising the steps of:

indexing the TSB shelves, SVP slots, and vocoders, and sequentially selecting a TSB shelf and a SVP slot according to the order of index;

determining whether the selected SVP slot has any frame offsets identical with a frame offset of a present call, and if it does not have any of them, selecting a vocoder contained in the selected SVP slot; and if the selected SVP has some frame offsets identical with the frame offset of the present call, determining whether a number of the frame offsets, which are identical with the present call's frame offset and contained in the selected SVP slot, is smaller than or equal to a number of the identical frame offsets contained in a next SVP slot, if the selected SVP slot has more frame offsets identical with the present call's than the next slot, selecting the next SVP slot after repeating the above progresses starting from the sequential selection of a slot, and if the number of the identical frame offsets contained in the selected SVP slot does not exceed the number of the identical frame offsets contained in the next SVP slot, selecting a vocoder contained in the selected SVP slot.

4. The method according to claim 3, wherein the sequential selection is performed starting from a low number or a high number.

5. The method according to claim 3, wherein, in determining whether a number of the frame offsets, which are identical with the present call's frame offset and contained in the selected SVP slot, is smaller than or equal to a number of the identical frame offsets contained in a next SVP slot, if the SVP slots in the TSB shelf have the same numbers of the frame offsets, which are identical with the present call's frame offset, a vocoder contained in the SVP slot of the TSB shelf which was originally selected is selected.

6. A method of selecting a vocoder in a CDMA mobile communication system, the method comprising the steps of:

indexing Transcoder Selector Bank (TSB) shelves, SVP slots, and vocoders, before sequentially selecting a TSB shelf and a SVP slot according to the order of index, and, after detecting a frame offset of a present call, calculating a number of frame offsets identical with the frame offset of the present call contained in the selected SVP slot; and comparing the number of the frame offsets, which are identical with the present call's frame offset and contained in the SVP slot sequentially selected, with numbers of the identical frame offsets contained in other SVP slots, and selecting a SVP slot having the fewest frame offsets identical with the present call's frame offset.

7. The method according to claim 6, wherein, in the step of selecting the SVP slot which has the fewest frame offsets, if the SVP slots of the TSB shelf have the same numbers of the frame offsets, which are identical with the present call's frame offset, a vocoder contained in the SVP slot of the TSB shelf which was originally selected is selected.

8. The method according to claim 6, wherein the sequential selection is performed starting from a low number or a high number.

* * * * *